Patented Dec. 1, 1925.

1,564,002

UNITED STATES PATENT OFFICE.

JOSEPH R. KUHN, OF MONTCLAIR, NEW JERSEY, ASSIGNOR, BY MESNE ASSIGNMENTS, TO CARLETON ELLIS, OF MONTCLAIR, NEW JERSEY.

ACID-RESISTANT SHELLAC SUBSTITUTE.

No Drawing. Application filed January 12, 1922. Serial No. 528,839.

*To all whom it may concern:*

Be it known that I, JOSEPH R. KUHN, a citizen of the United States, and a resident of Montclair, in the county of Essex and State of New Jersey, have invented certain new and useful Improvements in Acid-Resistant Shellac Substitutes, of which the following is a specification.

This invention relates to a method of making a resinous compound adapted for use as a shellac substitute and relates especially to synthetic resinous substances capable of resisting various strong acids and in particular strong sulphuric acid.

A resin suitable for use in making a spirit varnish or shellac substitute requires a degree of hardness such that the varnished surface will not become tacky and preferably of such a degree of hardness that the surface may be readily sandpapered or rubbed down in accordance with the practice of the trade. As alcohol is generally used as a solvent for shellac and as the painter is accustomed to the odor of alcohol and objects to foreign ordors it is desirable in order to meet this requirement that the shellac substitute be soluble in ordinary denatured alcohol. It is also desirable to have a resin which will not when in solution attack the tin can or other containers used to package such solutions. The odor of the resin must not be objectionable and in particular the color should be sufficiently light to not greatly change the color of the wood over which it is applied or to materially modify the color of stain when the composition is used as a varnish stain.

The invention comprises not only the resin, as such, but solutions made therefrom.

In carrying out the invention I treat a phenolic body with sulphur chloride to form a resinous compound and in doing this it is important to carefully select the phenolic body and to proportion the sulphur chloride to produce a resin meeting the requirements aforesaid. Ordinary phenol reacts with sulphur chloride but does not form resins having the desired solubility, hardness and other properties combined. The cresols give better results and I have found metaparacresol to be serviceable for the present purpose and the one which I shall herein employ for illustrative purposes. The term "metaparacresol" has been long used in the trade as covering mixtures of metacresol and paracresol, such mixtures being commonly produced in the usual processes of recovering cresol from tar oils, etc. The term is used in that sense throughout this specification. It is understood that it is not necessary to go to the expense of separating the metacresol from the paracresol, in making the products of the present invention.

If metaparacresol is treated with an equal weight of sulphur chloride a soft resin easily soluble in alcohol results. This however is too sticky or tacky for use as a varnish resin. If the same cresol is treated with for example twice its weight of sulphur chloride a resinous body also is obtained but in this case its solubility in alcohol will be poor. A resin made by using one and one-half times as much sulphur chloride as metaparacresol is however quite soluble in alcohol and possesses a high degree of hardness being capable of treatment with sandpaper in the rubbing down process without gumming or rolling. Resin of this character also has the remarkable property of resisting strong or even concentrated sulphuric acid. On the other hand resin made with an equal weight of sulphur chloride does not resist concentrated acid so readily, in fact more than one and one-third parts by weight of sulphur chloride to one part of cresol are required in order to obtain a resin which will be resistant to oil of vitriol. Above this the greater the proportion of sulphur chloride employed the more resistant the resin becomes to strong sulphuric acid. The resin made from sulphur chloride one and one-half the amount of cresol being sufficiently resistant for all practical purposes and besides having a desirable degree of solubility in denatured alcohol. Resins made with a higher proportion of sulphur chloride are best dissolved in mixed solvents such as a mixture of alcohol and benzol.

The sulphur chloride employed may be ordinary commercial sulphur chloride which usually contains 3 to 5% of free sulphur in solution or the commercial sulphur chloride may be chlorinated to a sufficient degree to remove the free sulphur as for example by introducing 5 to 6% of chlorine. If the amount of chlorine greatly exceeds this there is some tendency for alcohol insoluble products to form.

The mixing of the sulphur chloride and cresol may be carried out in this manner, namely the cresol is first diluted with an inert solvent such as benzol or toluol, one or two volumes of the solvent being used and sulphur chloride gradually introduced preferably with stirring. Hydrochloric acid is evolved and this may be collected and utilized if desired. The reaction may be started at room temperature and the temperature allowed to increase due to heat of reaction to 80° or 90° C. Too high a temperature or too protracted contact of anhydrous hydrochloric acid with the resin solution at elevated temperatures tends to form alcohol insoluble products.

The use of a solvent or diluent has advantages, one being that a more uniform grade of resin is obtained so that throughout the mass of resin there are not portions which contain a lesser percentage of combined sulphur which would be attacked by sulphuric acid.

The reaction between the cresol and sulphur chloride takes place very rapidly and as soon as the sulphur chloride has been introduced the reaction is practically complete and the solvent and remaining hydrochloric acid may be expelled. This may be carried out by blowing steam or heated air through the solution. Or the benzol or toluol may be distilled and recovered and air blown through the molten resin which serves the desirable purpose of eliminating a peculiar odor somewhat resembling iodoform that is present in the crude resin and is objectionable in a shellac substitute. The treatment with heated air may be at 125° to 150° C., the higher temperatures tending to slightly darken the resin. The heating and air blowing also tend to harden the resin somewhat. If the air blowing is carried out for a protracted period some insoluble resin may form especially at higher temperatures. It is therefore best to keep the air blowing temperature under 150° C. and blow the resin only for a period sufficient to eliminate the odor. This treatment also eliminates the hydrochloric acid. It is also possible to treat the resin with ammonia gas at the close of the air blowing operation to remove all hydrochloric acid. The latter preferably is completely removed in order that the resin may not have a rusting action of metals.

However the complete removal of acid brings with it a color change, the resin which is ordinarily prepared from clean, pure cresol and high grade sulphur chloride being of a straw or amber color. Removal of the acid causes the color to change to a brown which is usually objectionable. The addition of a small amount of acid will bring back the color and for this purpose I prefer to use phosphoric acid although other acids such as oxalic acid may sometimes be employed.

The resin in alcoholic solution when neutral has a peculiar action on tin cans turning the surface black. On the other hand when the alchohol solution is brought over on the acid side by the addition of a small amount of phosphoric acid the blackening effect on the tin surface disappears. The blackening action is probably due to reaction with the iron beneath the tinned surface.

It is my custom in testing samples of solutions with respect to their action on tin cans to sandpaper away the tin covering and apply the resin solution directly to the bright iron surface. I then add phosphoric acid to the solution little by little until I find an amount sufficient to prevent the surface from blackening while the coating of the varnish is drying thereon. In a rough and ready way the addition of phosphoric acid sufficient to bring about the color change of the alcohol solution from brown to light yellow suffices but for a safe margin it is advisable to use somewhat more than this amount of phosphoric acid.

The solution may be made up in the ratio of say 4 or 5 pounds of the resin to the gallon when employing denatured alcohol as a solvent. 4 pounds per gallon makes a desirable proportion. Some sulphur generally is present due to moisture in the materials, to sulphur in the sulphur chloride, and also traces of insoluble resin may form during the reaction. These substances may remain in a colloidally dissolved form in the alcohol for a time but on standing they eventually separate and settle forming a light yellow deposit. Preferably therefore I allow the solution to stand until the major proportion of sulphur etc. has settled out. This affords a bright clear light-colored solution of the desired alcoholic odor capable when brushed out on wood or other surfaces of drying readily forming a hard surface which may be sandpapered and which when the wood is properly protected by numerous coats may be flooded with sulphuric acid without any substantial action of the surface or on the wood beneath.

As an illustration one part by weight of metaparacresol was dissolved in an equal volume of toluol and sulphur chloride in an amount one and one-half times the weight of the cresol was slowly added. After hydrochloric acid had been freely evolved and the reaction had largely subsided air was blown through the solution at a temperature approaching 150° C. for a period of about one-half hour which sufficed to remove the acid and the toluol. The resin so obtained dissolved readily in denatured alcohol and a solution was made up in the proportion of about four pounds to the gallon, that is a gallon of the solution contained four pounds of the resin. This solution was dark brown in color and unattractive in appearance. On the addition of less than one-fourth of an ounce of syrupy phosphoric acid to a gallon the color changed to a light yellow of attractive appearance. The solution was allowed to stand several days when a small amount of sediment of a light yellow color collected at the bottom. The clear resin solution was withdrawn and was ready for use.

One test which I made with resin of this character was to place a fragment in a test tube and pour oil of vitriol over it. In other test tubes I placed fragments of shellac, Congo resin, Manilla resin, kauri and Pontianak rubber resin to which I likewise added oil of vitriol, the sulphuric acid acted almost immediately on all the resins, with the exception of the synthetic resin, turning these natural resins black and dissolving and destroying them. After days of exposure to the oil of vitriol my synthetic resin was in no way affected by the strong acid.

Such solutions therefore may be applied to wood just as shellac is used and have a useful function in protecting wood from acid fumes in factories and elsewhere where the atmosphere is polluted with acid bodies.

Various stains or coloring matters may be added to a solution prepared as above and in order to make the solution resemble the color of orange shellac, when such an affect is desired, a suitable orange dye such as chrysoidine may be added in small quantity.

While I have given very specific directions for preparing the acid resistant shellac substitute it should be understood that I do not limit myself to these exact proportions or procedures or to the precise solvents employed as variations may be made deviating to a greater or less extent from the foregoing procedure.

The foregoing is the result of experiments which I have carried out over a long period of time involving the preparation of many hundred samples of resin from phenol or cresol and sulphur chloride and involves thousands of experiments and I believe that from these investigations I have set forth one of the most desirable methods of producing a sulphur resin by treatment of a phenolic body with sulphur chloride to produce a product adapted for use as a spirit varnish.

What I claim is:—

1. The process of making a spirit varnish which comprises treating metaparacresol with about one and one-half times its weight of sulphur chloride in the presence of a hydrocarbon diluent, whereby a resin is formed in solution, blowing the solution with heated air at a temperature below 150° C. whereby the diluent and hydrochloric acid are removed, dissolving the deodorized resinous product in an alcoholic solvent and adding a small amount of phosphoric acid sufficient to change the solution from a brown to a yellow color.

2. The process of making a spirit varnish which comprises treating cresol with about one and one-half times its weight of sulphur monochloride in the presence of toluol whereby a resin is formed in solution, blowing the solution with heated air whereby the diluent and hydrochloric acid are removed, dissolving the resinous product obtained in an alcoholic solvent and adding a small amount of an acid sufficient to change the solution from a brown to a yellow color, such acid being less strongly reactive toward iron and tin, than is hydrochloric acid.

3. The process of making a spirit varnish which comprises treating metaparacresol with about one and one-half times its weight of sulphur monochloride in the presence of at least an equal volume of toluol whereby a resin is formed in solution, blowing the solution with heated air whereby the diluent and hydrochloric acid are removed, dissolving the resinous product obtained in an alcoholic solvent and adding a small amount of phosphoric acid sufficient to change the solution from a brown to a yellow color and to overcome blackening of tin cans by the solution.

4. The process of making a spirit varnish which comprises treating metaparacresol with more than its weight of sulphur chloride whereby a resin is formed in solution, blowing the solution with heated air at a temperature below 150° C. whereby the diluent and hydrochloric acid are removed, dissolving the resinous product obtained in an alcoholic solvent and adding a small amount of phosphoric acid sufficient to change the solution from a brown to a yellow color.

5. A varnish resin comprising hard, air-blown, deodorized phenolic sulphur chloride resin and phosphoric acid.

6. A varnish resin comprising hard, air-blown cresol sulphur chloride resin and phosphoric acid.

7. A varnish resin comprising hard, air-blown, deodorized cresol sulphur chloride resin and an acid, less active on iron and tin than hydrochloric.

8. A varnish resin comprising hard, alcohol-soluble deodorized cresol sulphur chloride resin of acid reaction.

9. A varnish comprising hard, air-blown, deodorized phenolic sulphur chloride resin, phosphoric acid and an alcoholic solvent.

10. A varnish comprising hard, deodorized cresol sulphur chloride resin, phosphoric acid and an alcoholic solvent.

11. A varnish comprising hard, air-blown cresol sulphur chloride resin, phosphoric acid and a solvent.

12. A spirit varnish comprising hard, deodorized cresol sulphur chloride resin, phosphoric acid and denatured alcohol in the proportions of about four pounds of resin to the gallon of solution.

13. A phenol sulfurchlorid resin the alcoholic solution of which is free from blackening action upon tin plate.

14. A phenol sulfur chlorid resin the alcoholic solution of which is free from blackening action on bright iron.

15. A sulfur-containing resin the alcoholic solution of which does not blacken bright iron.

16. A phenol sulfur chlorid resin, in a solvent comprising alcohol, which solution is free from blackening action upon tin plate, and bright iron.

JOSEPH R. KUHN.